United States Patent
Hamalainen et al.

(10) Patent No.: US 9,301,154 B2
(45) Date of Patent: Mar. 29, 2016

(54) ARRANGEMENTS FOR CONTROLLING ANTENNAS

(75) Inventors: Seppo Olavi Hamalainen, Espoo (FI); Osman Nuri Can Yilmaz, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 99 days.

(21) Appl. No.: 14/115,900

(22) PCT Filed: May 6, 2011

(86) PCT No.: PCT/EP2011/057330
§ 371 (c)(1),
(2), (4) Date: Dec. 9, 2013

(87) PCT Pub. No.: WO2012/152306
PCT Pub. Date: Nov. 15, 2012

(65) Prior Publication Data
US 2014/0113676 A1  Apr. 24, 2014

(51) Int. Cl.
| H04B 7/00 | (2006.01) |
|---|---|
| H04W 16/28 | (2009.01) |
| H04W 72/04 | (2009.01) |
| H04B 7/06 | (2006.01) |
| H04W 52/42 | (2009.01) |
| H04W 28/18 | (2009.01) |
| H04W 52/34 | (2009.01) |
| H04B 7/04 | (2006.01) |

(52) U.S. Cl.
CPC ............ *H04W 16/28* (2013.01); *H04B 7/0413* (2013.01); *H04B 7/0617* (2013.01); *H04B 7/0689* (2013.01); *H04B 7/0691* (2013.01); *H04W 28/18* (2013.01); *H04W 52/343* (2013.01); *H04W 52/42* (2013.01); *H04W 72/046* (2013.01); *H04B 7/0452* (2013.01); *H04B 7/0456* (2013.01); *H04B 7/0469* (2013.01); *H04B 7/0491* (2013.01)

(58) Field of Classification Search
CPC .. H04B 7/0456; H04B 7/0617; H04B 7/0615; H04B 7/0452; H04B 7/024
USPC ............. 455/522, 69, 500, 517, 575.1, 575.7, 455/561, 562.1, 445, 422.1, 403, 524, 525, 455/67.11, 423–425; 370/328, 329, 310, 370/252, 343; 343/702
See application file for complete search history.

(56) References Cited

U.S. PATENT DOCUMENTS

| | | | | |
|---|---|---|---|---|
| 6,151,512 | A * | 11/2000 | Chheda et al. | 455/562.1 |
| 2003/0161282 | A1 | 8/2003 | Medvedev et al. | 370/329 |
| 2004/0266442 | A1* | 12/2004 | Flanagan et al. | 455/445 |
| 2006/0233131 | A1 | 10/2006 | Gore et al. | 370/328 |
| 2008/0039089 | A1* | 2/2008 | Berkman et al. | 455/436 |
| 2009/0046768 | A1 | 2/2009 | Pare, Jr. | 375/220 |
| 2010/0091675 | A1 | 4/2010 | Sawai | 370/252 |
| 2010/0254325 | A1* | 10/2010 | Narasimhan | H04B 7/024 370/329 |
| 2010/0272218 | A1* | 10/2010 | Yeh et al. | 375/330 |
| 2010/0291931 | A1* | 11/2010 | Suemitsu et al. | 455/436 |

FOREIGN PATENT DOCUMENTS

| EP | 1 227 539 A1 | 7/2002 |
|---|---|---|
| EP | 2 337 234 A1 | 6/2011 |
| WO | WO 2010/141786 A1 | 12/2010 |

* cited by examiner

*Primary Examiner* — Keith Ferguson
(74) *Attorney, Agent, or Firm* — Harrington & Smith

(57) ABSTRACT

A method of controlling an antenna system in which performance indicators relating to capacity and coverage are used to generate an instruction to adjust the order of MIMO provided by the antenna system and at least one of the level of beam forming and transmission power. The instruction may not be followed in case a decision-making entity decides that it is not appropriate.

14 Claims, 7 Drawing Sheets

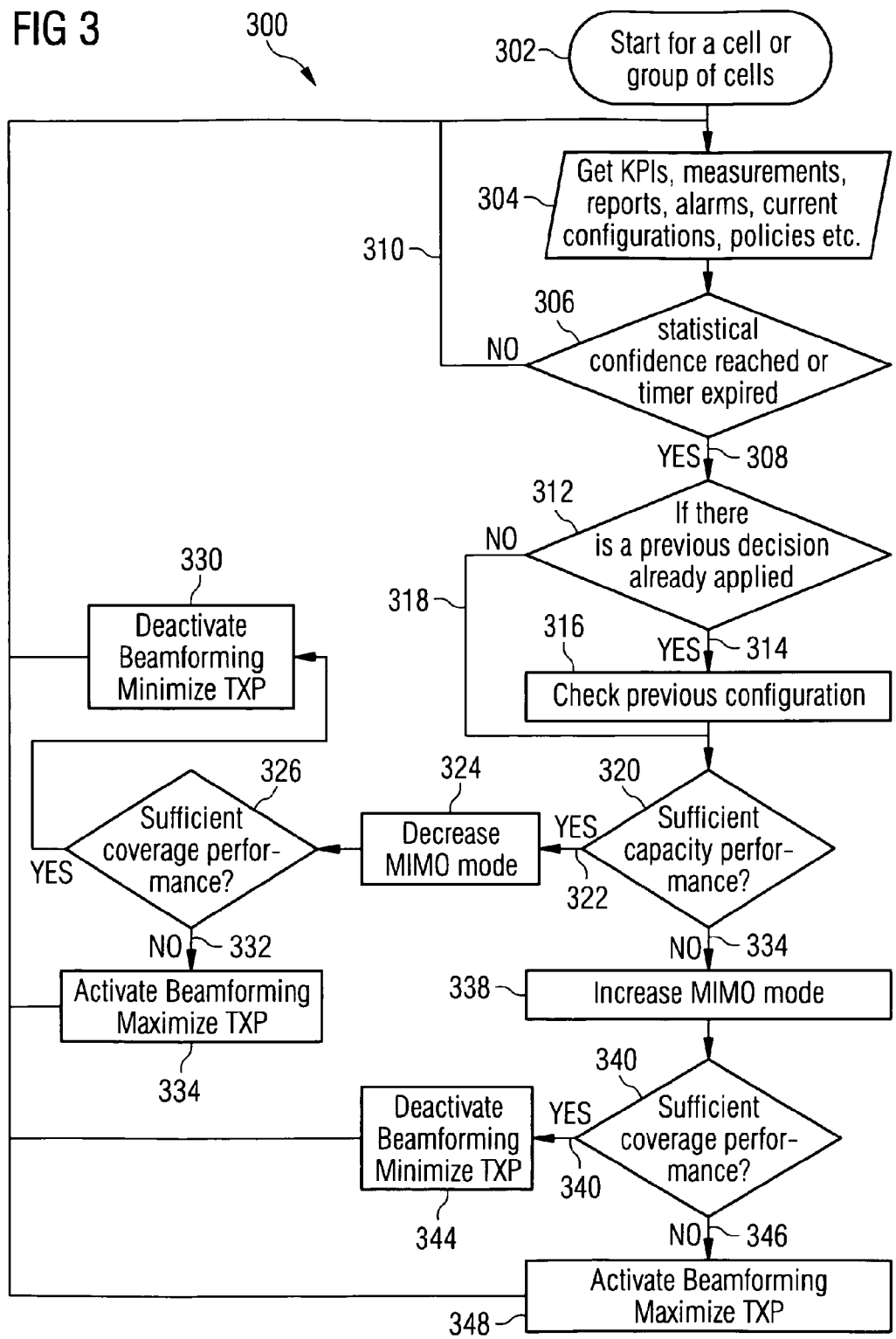

ARRANGEMENTS FOR CONTROLLING ANTENNAS

Figure 1:
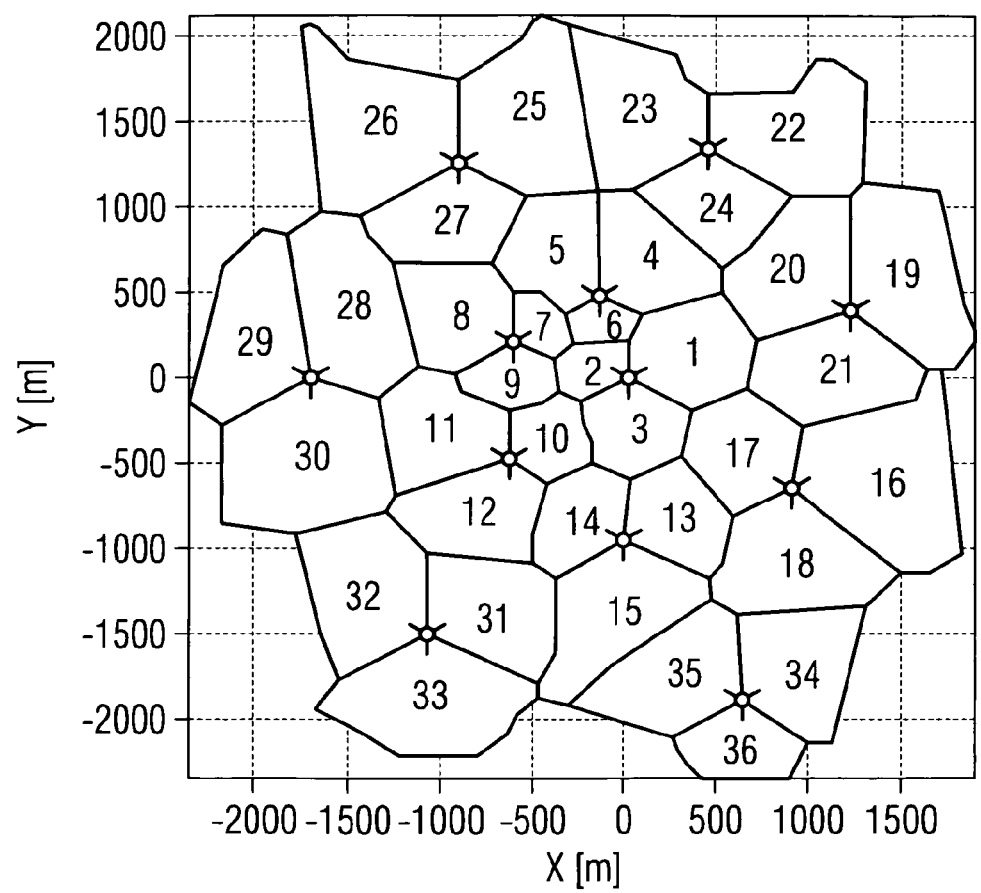

This invention relates to arrangements for controlling antennas. It is particularly, but not exclusively, related to mode selection in antenna systems.

Adaptive Antenna Systems (AAS), also known as smart or advanced antenna systems, have been developed in order to provide better system performance and radio network capacity. Although until recently, implementing AAS in base stations in cellular networks had been technically challenging, now, from a technical point of view, most of the related problems have been, or are being, solved.

In AAS, there are two main multiple antenna technologies: Multi-Input Multi-Output (MIMO) techniques (for example spatial multiplexing/transmit diversity by space time/frequency coding) in which there are multiple antenna elements, and beam-forming in which signal quality is improved via increased gain provided by correlated antenna elements. AAS technologies are used to improve signal robustness and to increase system capacity (for example, by using MIMO techniques), coverage (for example, by beam-forming), and single-user data rates. Each technique has its own performance benefits and costs.

New cellular radio network technologies such as 3GPP Long Term Evolution (LTE) and Worldwide Interoperability for Microwave Access (WiMAX) support high order MIMO technologies (for example, 4×4 for LTE and 8×8 for LTE-A) and beam-forming to provide improvements to the performance of a network, for example in terms of capacity and coverage. Therefore, it is desirable to make AAS technologies attractive from the point of view of network operators. However, certain characteristics of AAS implementations can act as a deterrent to their adoption such as a relatively large size, the weight of antenna systems supporting multiple antenna technologies, and their power consumption.

Active antenna technology decreases the implementation cost of AAS by providing lower radio block design cost and advanced digital integration. However, the implementation cost of high order MIMO, and support of multi-band and beam controlling via a multi-column AAS, is still an obstacle to make the advanced antennas attractive for network operators in terms of capital expenditure (CAPEX).

MIMO technologies are applied in cellular radio networks mainly to increase the capacity. However, this means that a network may have unnecessarily high power consumption and capacity due to MIMO use when the traffic load is low. This may lead to an undesirably high operating expenditure (OPEX). In order to deal with this, in certain circumstances, a base station or a cell may be switched off, or its power may be reduced. However, this may create a coverage hole in the network. Detecting the location of coverage holes and configuring the network to remove them is an inconvenient task for a network operator. If the network is planned to be interference or capacity limited (in which cells are relatively close to each other), neighbouring cells can be used to provide coverage for any area previously covered by a switched-off cell or subject to energy-saving measures. However, further optimisation is also needed for interference or capacity limited network environments experiencing either high or low traffic loads because of uneven traffic distribution and network environment.

Although beam-forming is useful in noise or coverage limited environments (in which cells are relatively far apart), it is less useful in interference or capacity limited environments and may actually increase interference due to the high traffic load and small distances between base stations.

An interference or capacity limited network may be optimised by using neighbouring base stations to cover areas left uncovered by switched-off cells. Transmit power, horizontal beam-width, and antenna tilt of neighbouring base stations may be changed so that coverage is extended to these areas. However, conditions in a real network environment may be quite different to a hypothetical idealised hexagonal network layout conditions. For example, FIG. 1 shows an irregular network layout in which a cell #6 has interference limited environment conditions with a neighbouring cell #2 on the one hand and noise or coverage limited conditions with a cell #1 on the other hand. In the case of low load being handled by cell #6, although switching off this cell can appear to be reasonable, because there should be sufficient capacity to be handled by other cells such as the cell #2, since there is a noise or coverage limited condition between the cell #1 and the cell #6, this may lead to a coverage problem, for example a hole in the network coverage.

Another problem is that changing the direction of the beam by adjusting antenna tilt does not necessarily solve coverage hole problems in a noise or coverage limited environment because the antenna may already be at its coverage limit. As a result, more coverage may not be obtained by up-tilting the antenna, for example to cover a hole caused by a switched-off neighbouring base station. Hence, switching-off cells may not be desirable in noise or coverage limited environments such as in rural areas because it may not be possible to cover any hole thus created. Furthermore, in highly populated urban areas such as Shinyuku or Manhattan, switching-off base stations to save energy may not be a practical option for the present configurations of antenna systems because there is a continuous demand for a high traffic load.

According to a first aspect of the invention there is provided a method of controlling an antenna system in which performance indicators relating to capacity and coverage are used to adjust the order of MIMO provided by the antenna system and at least one of beam forming and transmission power.

The method may adjust the level of at least one of beam forming and transmission power.

Preferably, the method provides for mode selection in the antenna system. Preferably, in the method there is a mode selection decision for MIMO and a mode selection decision for beam-forming mode and/or transmission power.

Preferably, the method involves optimisation of the transmission characteristics of a base station or a group of base stations.

The antenna system may be an Adaptive Antenna System.

The method may involve using self-organising network capabilities of one or more base stations.

The method may carry out optimisation to find an effective balance of power, coverage and capacity.

The method may be carried out in a base station, in an entity controlling the base station, or in a network management system. It may be carried out by the cooperation of at least two of these entities. The method may be centralised optimisation. It may be distributed optimisation. It may be local optimisation. It may be hybrid optimisation. In any case, a number of cells may be jointly optimised.

The performance indicators relating to capacity and coverage may be measurements relating to quality, traffic or load, or mobility.

The method may use other indicators and data such as failure-related data, policies, and/or data from a configuration management function and/or geo-location information.

The method may be wholly or partially carried out in a SON module. The module may use traffic and load related indicators to monitor capacity performance. The module may use failure-related data and mobility related indicators to monitor coverage performance.

There may be an optimisation cycle for a single cell.

In the method there may be a decision to check whether statistical confidence has been reached, that is whether a sufficient quantity of statistics has been collected to make a proper evaluation, or a sufficient period of time has passed.

The method may check whether a cell being optimised has sufficient capacity. If it is determined that this is not the case, the order of MIMO may be activated or increased. The method may check whether a cell being optimised has sufficient coverage. If it is determined that this is not the case, beam-forming may be activated and/or transmission power may be increased in order to provide coverage to an area identified as lacking coverage. Both checks may be carried out with one check being followed by the other.

Transmission power may be adjusted in a collaborative manner between neighbouring cells.

If there is a determination to switch off one base station, this may lead to a decision to activate beam-forming in a neighbouring cell and/or to maximise the transmission power of the neighbouring cell to compensate for any coverage problem caused.

An optimisation method does not have to be performed so that adjustments to the operation of an antenna system are necessarily carried out. It may generate potential optimisation adjustments for one or more cells which are not necessarily carried out. Whether to carry out an optimisation adjustment or optimisation adjustments for a cell or a number of cells may be decided at a higher level, for example in a network management system or at a lower level, for example following negotiation between base stations.

Optimisation adjustments may be applied to a group of base stations in order to determine suitable candidate optimisation actions which may potentially be applied to the base stations and then further decision-making steps may be carried out to determine which optimisation actions are actually applied to which base stations.

A network management system may generate different cases of optimising a number of cells, and then choose an identified case which is most beneficial in terms of cost and performance. This may be done according to the policies of a network operator, for example a particular policy prioritising cost saving.

A cell and its neighbours may be evaluated and a balanced decision may be made in terms of power consumption, capacity, and coverage according to an operator's policies/targets.

If the method determines optimisation to be applied to a cell, neighbouring cells may be notified that there has been a change, so that they can then perform their own optimisation methods to determine whether their operation needs to be changed.

Preferably, the method according to the first aspect of the invention may be combined with a method of controlling an antenna system in which at least one active element is switched between a first antenna element and a second antenna element of an antenna system so that in one switched configuration the first antenna element is contributing to the antenna system operating in MIMO mode and in another switched configuration the second antenna element is contributing to the antenna system operating in beam-forming mode.

According to a second aspect of the invention there is provided an entity capable of controlling an antenna system, the entity having an input for receiving performance indicators relating to capacity and coverage, a processing unit for using the performance indicators generate an instruction to adjust an order of MIMO provided by the antenna system and at least one of beam forming and transmission power, and an output for providing the instruction to enable it to be applied.

The entity may comprise a processor. It may comprise a SON module. It may comprise a functionality in an OAM system or in a network management system.

The entity may be comprised by a base station. The base station may comprise the entity and the antenna system.

The instruction may not be followed if a decision-making entity decides that it is not appropriate.

According to a third aspect of the invention there is provided a communication system comprising a base station and an entity capable of controlling an antenna system, the entity having an input for receiving performance indicators relating to capacity and coverage, a processing unit for using the performance indicators generate an instruction to adjust an order of MIMO provided by the antenna system and at least one of beam forming and transmission power, and an output for providing the instruction to enable it to be applied.

According to a fourth aspect of the invention there is provided a computer program product comprising software code that when executed on a computing system performs a method of controlling an antenna system in which performance indicators relating to capacity and coverage are used to adjust the order of MIMO provided by the antenna system and at least one of beam forming and transmission power.

According to a fifth aspect of the invention there is provided a method of controlling an antenna system in which at least one active element is switched between a first antenna element and a second antenna element of an antenna system so that in one switched configuration the first antenna element is contributing to the antenna system operating in MIMO mode and in another switched configuration the second antenna element is contributing to the antenna system operating in beam-forming mode.

Preferably, the at least one active element is common to both the first and the second antenna elements. The common active element may be switched adaptively according to desired operation of the antenna system. The antenna elements may be antenna columns. They may be sub-parts of antenna columns.

The antenna system may be switchable between a mode to provide a higher order of MIMO and a lower order of beam-forming, or no beam-forming, and a mode to provide a lower order of MIMO and a higher order of beam-forming. It may have other modes such as a higher order of MIMO and a lowest order of beam-forming and a lower order of MIMO and a lowest order of beam-forming.

The antenna system may be switched to a non-energy-saving mode in which MIMO is on and beam-forming is off. The antenna system may be switched to reduce the order of MIMO in a low traffic case. The antenna system may be switched to an energy saving mode in which some cells are switched off, MIMO mode is not used, and beam-forming has been re-activated to maximise coverage.

The antenna system may comprise a plurality of passive elements such as antenna radiator elements, a plurality of active elements, such as RF chains, and a switching arrangement which is capable of switching links between the active elements and the passive elements.

If a capacity-related problem is detected, MIMO may be used with a common RF chain being activated for MIMO mode and automatically de-activated for beam-forming, and if a coverage-related problem is detected, the common RF chain may be activated for beam-forming and automatically de-activated for MIMO.

According to the invention, the number of active elements which are actually active may be maximised. However, in some cases, not all active elements are active.

According to a sixth aspect of the invention there is provided an antenna system comprising at least one active element, a first antenna element, a second antenna element, and a switching unit in which the switching unit is capable of linking the active element to the first antenna element in a first configuration and capable of linking the active element to the second antenna element in a second configuration so that in the first configuration the first antenna element is contributing to the antenna system operating in MIMO mode and in the second configuration the second antenna element is contributing to the antenna system operating in beam-forming mode.

The antenna system may be comprised by a base station.

According to a seventh aspect of the invention there is provided a communication system comprising an antenna system according to the sixth aspect of the invention.

The system according to preceding aspects of the invention may comprise a plurality of base stations. Antenna systems of the base stations may have their MIMO and/or beam-forming operational states altered in order to provide complementary effects in order to save power while not adversely affecting system operation. The system may be an LTE communications system. It may be a 3 G communications system.

According to an eighth aspect of the invention there is provided a computer program product comprising software code that when executed on a computing system performs a method of controlling an antenna system in which at least one active element is switched between a first antenna element and a second antenna element of an antenna system so that in one switched configuration the first antenna element is contributing to the antenna system operating in MIMO mode and in another switched configuration the second antenna element is contributing to the antenna system operating in beam-forming mode.

The computer program product according to preceding aspects of the invention may have executable code portions which are capable of carrying out the steps of the method.

Preferably, the computer program product is stored on a computer-readable medium. It may be stored in a non-transitory way.

The invention may provide a self-optimisation method that identifies a cell's capacity and coverage performance and proposes a power and capacity optimised solution for used AAS/MIMO technologies, and also TXP, so that a network provides significant energy-saving, and also performance, without outage.

The invention may enable identification of a problem and optimisation of the system in an appropriate way by using advanced antenna and SON technologies.

Figure 2:
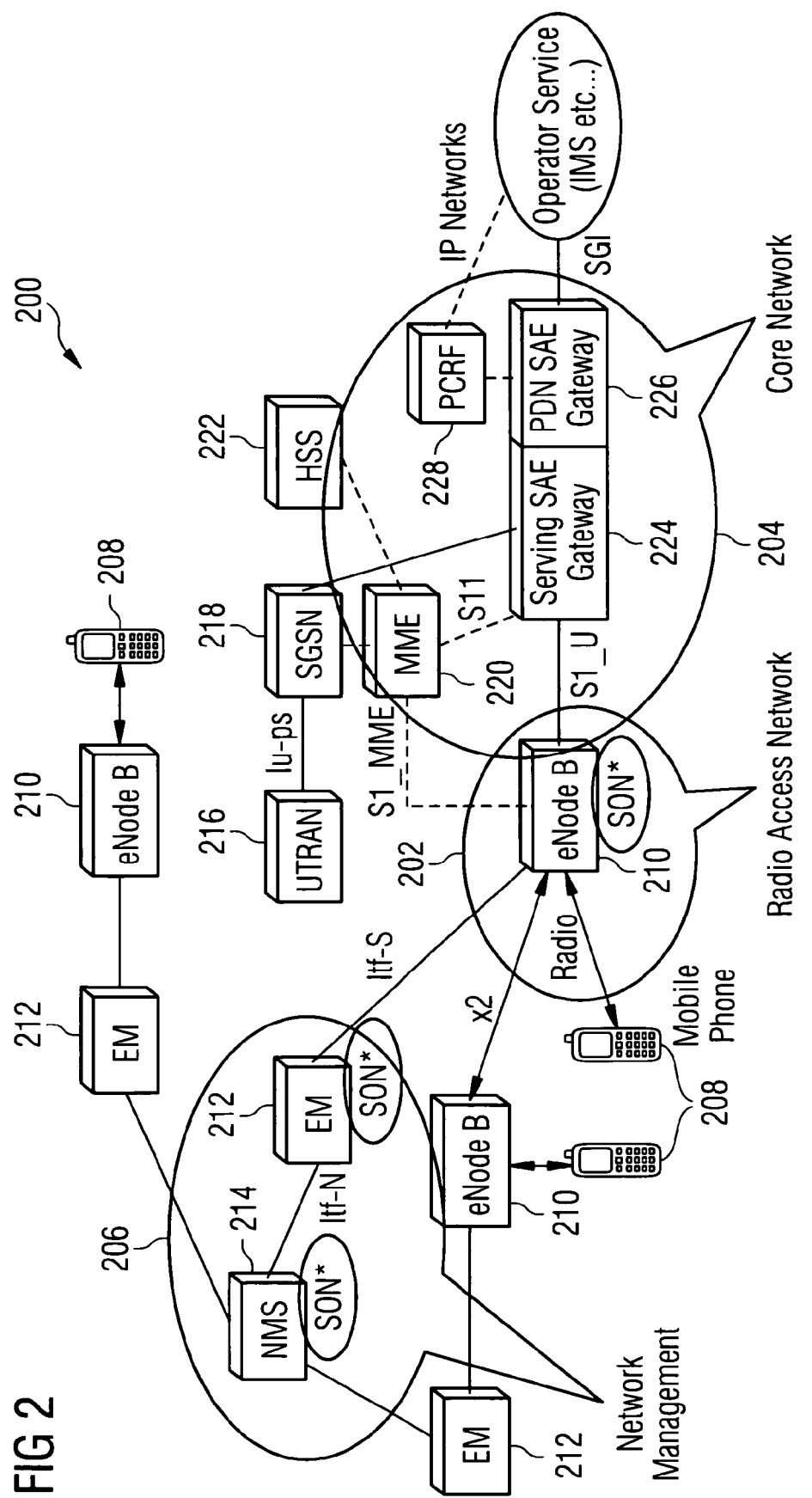
Figure 5:
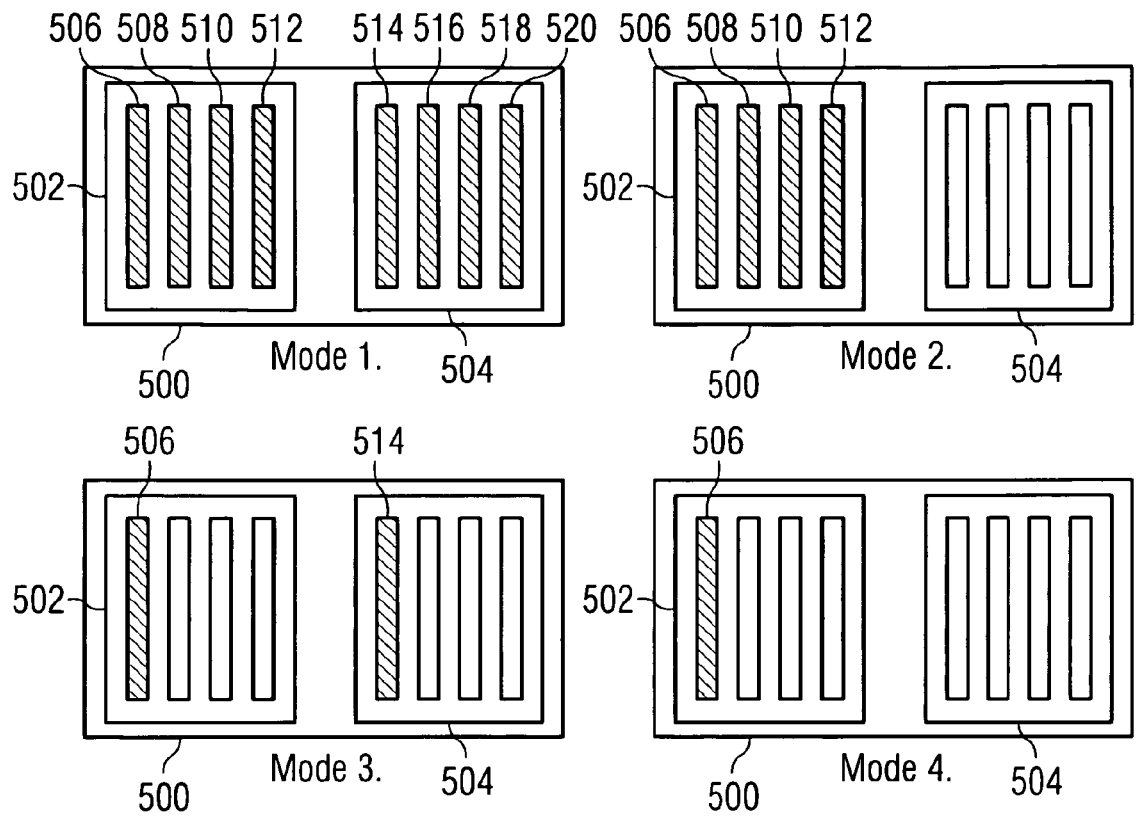
Figure 6:
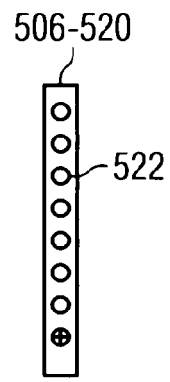
Figure 7:
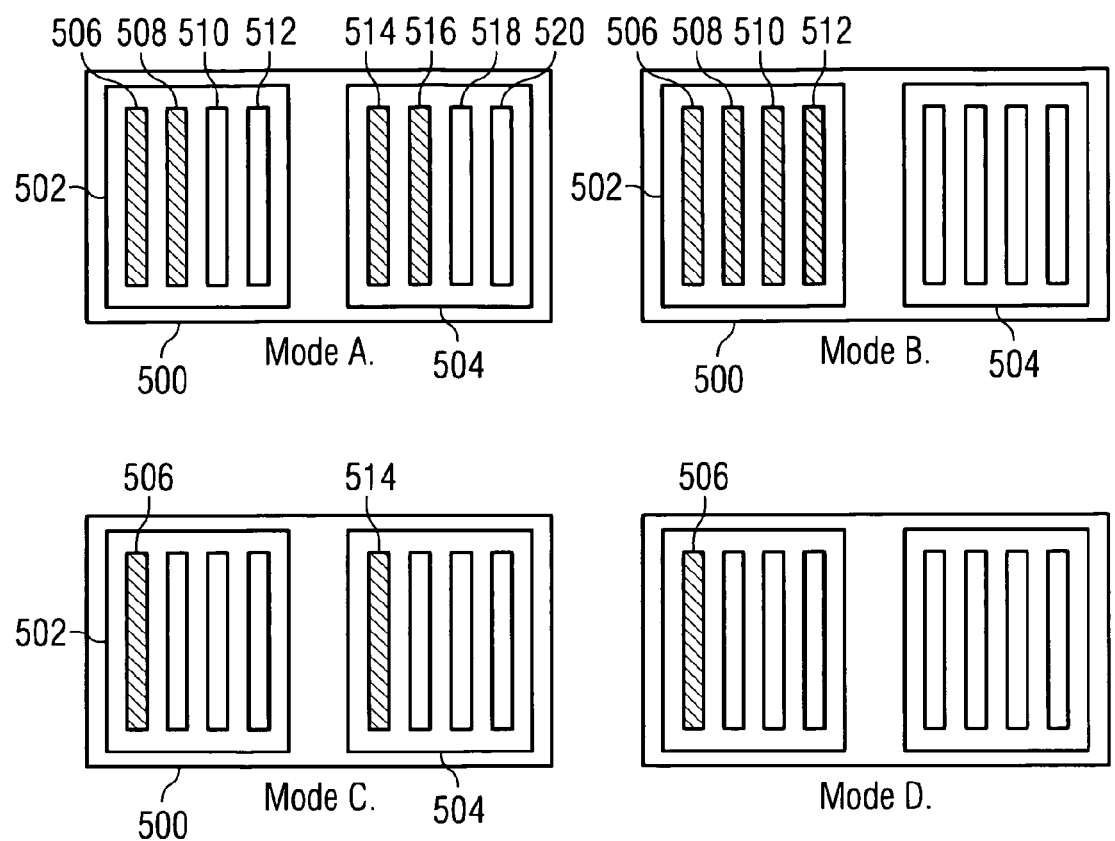

An embodiment of the invention will now be described, by way of example only, with reference to the accompanying drawings in which:

FIG. 1 shows an irregular network layout;
FIG. 2 shows an LTE communications system;
FIG. 3 shows a method according to the invention; and
FIGS. 4(*a*) and 4(*b*) show an application of the method to base stations.
FIG. 5 shows different energy-saving modes in an antenna system;
FIG. 6 shows a single antenna column;
FIG. 7 shows different switching modes in an antenna system; and
FIG. 8 shows an antenna system;
FIG. 1 has been described in the foregoing.

FIG. 2 shows a Long Term Evolution (LTE) communications system 200. LTE is a communications technology in which a radio interface is provided based on Orthogonal Frequency Division Multiple Access (OFDMA). LTE enables higher peak data rates and more users per cell as well as lower control plane latency than previously deployed 3rd Generation (3G) technologies. Furthermore, the core network architecture of LTE, which is called System Architecture Evolution (SAE), is simplified. In SAE, central control functions of Radio Network Control (RNC) are distributed between base stations referred to as enhanced Node Bs (eNBs) and a Mobility Management Entity (MME). eNBs are able to communicate with each other using an inter-eNB interface, the X2 interface, and have more control functions compared to base stations in earlier network architectures.

The LTE communication system 200 incorporates self-organising network (SON) capabilities. SON is generally taken to mean a capability in a communications network in which the tasks of configuring, operating, and optimising are largely automated and so self-configuration, self-optimisation, and self-healing are possible. SON-type networks, and systems incorporating such networks, aim to reduce operational expenses while enabling a reliable user experience even under adverse conditions such as congested traffic.

The system 200 comprises a radio access network (RAN) 202, a core network (CN) 204, and a network management part 206. The RAN 202 provides mobile and radio access to mobile terminals 208 via eNBs 210. The RAN 202 may be referred to as an evolved UMTS Terrestrial RAN (eUTRAN) and can be considered to be a single entity, for example that shown as the element 216. The core network 204 has functionality to provide for call switching/routing, and call control, service provision, authentication and charging, and interconnection enabling access to other networks.

The network management part 206 comprises element managers (EMs) 212 under the control of a network management system (NMS) 214. The EMs 212 manage the physical configuration of network element (NEs) such as the base stations, referred to as configuration management (CM), and monitor such NEs for the purposes of performance management (PM) and fault management (FM), and also to allow the NMS 214 to configure and manage resources of the network. The network management part 206 handles aspects of network operation including charging, configuration, performance, fault control, and tracing. The network management part 206, comprising the EMs 212 and the NMS 214, is a sub-part of the general operation, administration, and maintenance (OAM) capability of the system 200.

The system 200 also comprises other network elements used in its operation including:

a mobility management entity (MME) 220 for tracking and paging the mobile terminals 208 and for other tasks including authentication (in conjunction with a home subscriber server (HSS) 222), identity management, and authorisation;

the HSS 220 in the form of a database for controlling and handling subscription related information and being responsible for performing authentication and authorisation related tasks;

a serving gateway (SGW) capable of handling and delivering of packets to and from the mobile terminals 208 in an area under its control, the SGW comprising a serving system architecture evolution (SAE) gateway 224 sitting in the user plane where it forwards and routes packets to and from base stations 208 and a Packet Data Network (PDN) SAE gateway 226, the serving SAE gateway 224 also serving as a local mobility anchor, and the PDN SAE gateway 226 acting as an interface between the network of this system 200 and other packet data networks such as the Internet or SIP-based IMS networks; and a policy and rules charging function (PRCF) or policy server 228 for controlling the interaction of users, user groups, and applications within the system in order to provide appropriate services and quality of service.

It should be noted that various of the elements in the network, the eNBs 210, the EMs 212, and the NMS 214, have self-organising sub-parts or modules. This can be seen in the case of examples of these elements being designated as SON.

In the system 200, various measurements relating to the operation of the network are obtained/generated in the base stations. A base station transforms its measurements into performance data such as key performance indicators (KPIs).

A KPI is one or more measurements put into a form which is convenient for use in decision-making. There are many types of KPIs, and they can be classified into different classes, for example:

Quality KPIs in uplink/downlink (UUDL), for example Channel Quality Indicator (CQI) distribution useable for DL performance monitoring, and Sounding Reference Symbol (SRS) distribution useable for UL performance monitoring;

Traffic/load KPIs in UL/DL, for example the number of Physical Resource Blocks (PRBs) used in UL/DL per channel per unit time interval, the number of PRBs used in UL/DL per mobile terminal per unit time interval, and the number of active/idle users per unit time interval; and Mobility KPIs in UUDL, for example the number of handover (HO) failures with root causes per neighbouring cell relationship, and the RSRP distribution per cell, or cell neighbour relationship.

A base station may also produce other indicators and data such as failure-related data. This may include the numbers of radio link failures (RLFs), call drops, and alarms.

In addition to the information represented by KPIs and failure-related data, information including policies, data from a configuration management function (such as antenna transmission power), and geo-location information, may be logged and/or available and for use in decision-making. An example of a policy may be a weighting or other indicator expressing a preference in terms of whether power saving or capacity is to be prioritised. Policies can vary over the course of a day, or over several days.

Once generated, the KPIs, and any other indicators and data, are provided to the OAM capability. In the present case of an LTE system, the KPIs and other relevant data, are sent to the OAM capability via the interfaces Itf-S and Itf-N and/or shared via a logical link/interface X2 between different eNBs in eUTRAN.

According to the invention, the OAM capability (or one or more base stations in the case of a distributed SON arrangement), receives quality, traffic, and mobility KPIs, and/or any other relevant information in order to optimise the operation of the base stations 210, and thus of the system 200.

Optimisation, that is finding an effective balance of power, coverage and capacity, can be done via the NMS 214 in which case it is referred to as centralised optimisation. If optimisation is carried out by the cooperation of several SON modules in the base stations 210, information is exchanged via X2 logical links and the optimisation process is referred to as distributed optimisation. If a single SON module in a single base station is used, it is referred to as local optimisation in which decision-making is based on information available in that base station.

In a variant of the wholly centralised approach, another approach, referred to here as hybrid optimisation, may be used. A hybrid SON architecture is based on the use of SON modules in the base stations. In this way, relevant tasks can be shared by the SON modules in the base stations 210 and also the corresponding SON functionality in the NMS 214.

Thus it will be seen that there are three approaches: centralised optimisation, distributed optimisation, and localised optimisation. Any one of these may be used, or even a combination of them, such as the hybrid approach which is a combination of centralised optimisation and distributed optimisation, with some decision-making taking place in the NMS, and some decision-making taking place in base stations so that optimisation is carried out based on information local to a base station or information exchanged between base stations over the X2 interface, and information provided to the NMS.

It may be preferred to apply centralised optimisation since the NMS 214 is able to access/maintain reliable knowledge about the performance of the system in general, and base stations in particular, which increases the reliability of any optimisation decision.

Optimisation will now be described with reference to FIG. 3 showing an optimisation method according to the invention. Although FIG. 3 is presented being carried out in relation to a single cell, it should be noted that it can be applied both in relation to local optimisation of a single cell, as a single cell operation carried out together with single cell operations for other cells in order to perform centralised or distributed optimisation, or applied in the joint optimisation of a number of cells. It will be understood that the method may be applied to jointly optimise a group of cells, or to optimise cell by cell. The method may be applied to optimise cells which are not neighbouring with respect to each other.

The optimisation method of FIG. 3 may be used by each of the optimisation approaches referred to in the foregoing.

Referring now to FIG. 3, this shows an optimisation cycle 300 for a single cell. Optimisation is started 302, and a SON module in the base station 210 of that cell receives 304 the necessary KPIs, as well as data about current configurations, alarms, geo-location, and policies of the operator of the system 200. The SON module uses traffic and load related KPIs to monitor capacity performance (for example, the number of utilized PRBs per channel, the number of users in a cell, the number of capacity blocked users, and/or the number of unsatisfied users), and failure-related data and mobility related KPIs, to monitor coverage performance (for example, the number of radio link failures and call drops in a cell, hand-over drops/failures per cell neighbour relationship, and/or the RSRP level per cell relationship). Failure-related data can be used to identify the presence of coverage holes which may not be detected by quality and load measurements.

In a subsequent block, decision block 306, it is checked whether statistical confidence has been reached, that is whether a sufficient quantity of statistics has been collected to make a proper evaluation, and thus a reliable decision, or whether a timer has expired. If the check indicates "yes", a decision path 308 is followed. If the check indicates "no", a decision path 310 is followed and the method loops back to block 304 and starts from that point and a new set of measurements is gathered. The method can then be applied to measurements previously collected and the new set of measurements.

Therefore, according to a "yes" decision, the decision path 308 is followed and in a decision block 312 it is checked whether a "previous decision has already been applied". If such a previous decision has been applied, that is "yes", then a decision path 314 is followed and, as a result, a previous configuration is checked 316. If such a previous decision has not been applied, that is "no", a decision path 318 is followed and the optimisation cycle 300 moves on to applying coverage performance and capacity performance monitoring. The blocks 312 and 316 are used to check if there has been an incorrect, previously applied, configuration in order to avoid re-applying it and becoming stuck in a loop.

The application of KPIs defining quality and traffic will now be described. In a decision block 320, it is checked whether the cell being optimised has sufficient capacity. This may be indicated by an indication of too high a level of traffic. If a case of "sufficient capacity" is determined, a decision path 322 is followed to a block 324 in which the MIMO mode of the base station of the cell is decreased in order to reduce the number of active antenna elements. This reduces capacity and also reduces power consumption. Once this is done, a further decision is carried out in a decision block 326 to determine if there is sufficient coverage performance. If this is determined to be the case, that is "yes", a decision path 328 is followed, and, as a result, for that cell, beam-forming is de-activated and transmission power (TXP) is decreased (if possible) 330. If it is determined that there is insufficient coverage performance, that is "no", a decision path 332 is followed and beam-forming is activated and TXP is increased (if necessary) 334 in order to provide coverage to any area identified as lacking coverage.

In the event that, in the decision block 320, there was a determination of insufficient capacity performance, a decision path 336 is followed to a block 338 in which the MIMO mode of the base station is increased. Once this is done, a further decision is carried out in a decision block 340 to determine if there is sufficient coverage performance. If this is determined to be the case, that is "yes", a decision path 342 is followed, and, as a result, for that cell beam-forming is de-activated and TXP is decreased (if possible) 344. If it is determined that there is insufficient coverage performance, that is "no", a decision path 346 is followed and beam-forming is activated and TXP is increased (if necessary) 348.

According to the foregoing, KPIs are used to check whether there are capacity or coverage limitations in blocks 320, 326 and 340.

As an example of the use of KPIs, Quality KPIs may be used to help the network identify a problem and make a decision for an appropriate optimisation step. CQI, an example of a quality related measurement, corresponds to measured signal quality in a mobile terminal which is used, for example, for AMC (Adaptive Modulation and Coding) in down-link.

Information relating to a KPI may be provided in the form of a distribution, a single value, and/or a single value and a standard deviation.

CQI or any other quality measurement is sent to the OAM as a KPI in a specified format (for example a histogram if the KPI is provided as a distribution) and may give the network reliable information for the quality of service (QoS) of served mobile terminals in the cell. For instance, the cumulative distribution of CQI may be used to determine cell coverage performance in respect of mobile terminals at the edge of a cell, and can be used to detect coverage problems, and also may be used to determine an interference or a capacity problem.

Accordingly, it will be seen that the optimisation cycle 300 can have four outcomes:
1) If there is sufficient capacity, the outcome will be a reduction in the operation of the MIMO capability of the base station, and also de-activation of beam-forming and minimisation of TXP in the case that there is sufficient coverage performance.
2) If there is sufficient capacity, the outcome will be a reduction in the operation of the MIMO capability of the base station, and also activation of beam-forming and maximisation of TXP in the case that there is insufficient coverage performance.
3) If there is insufficient capacity, the outcome will be an increase in the operation of the MIMO capability of the base station, and also de-activation of beam-forming and minimisation of TXP in the case that there is sufficient coverage performance.
4) If there is insufficient capacity, the outcome will be an increase in the operation of the MIMO capability of the base station, and also activation of beam-forming and maximisation of TXP in the case that there is in sufficient coverage performance.

It will be understood that analysis of relevant KPIs is carried out to determine if there is sufficient capacity and analysis of relevant KPIs is carried out to determine if there is sufficient coverage.

Although it is stated in the preceding outcomes that beam-forming is activated or de-activated as the context requires, it will be understood that if beam-forming is already active, activation simply refers to a continuation of that state, and if beam-forming is already not active, de-activation simply refers to a continuation of that state. Accordingly, it can be seen that it is not essential for there to be a change in the state of beam-forming and also minimisation or maximisation of TXP. In fact, there may be variants of the invention in which there is only a change in the state of beam-forming, only minimisation or maximisation of TXP, or an elected choice between change in the state of beam-forming or minimisation or maximisation of TXP, by the SON module or whatever decision-making entity is in operation. In this last variant, there will be more than four possible outcomes.

Furthermore, minimisation or maximisation of TXP does not necessarily have to involve binary switching between low and high states, but may refer to a progressive increasing or decreasing of TXP with a possible ultimate outcome that TXP is at a maximum level or is reduced to zero.

Once the relevant action has been carried out in the cell, that is operations defined by blocks 324, 330, 332, 338, 344 and 348, the method loops back to the beginning. At this point, new measurements will be taken, and new KPIs generated in the eNB serving that cell. In order to avoid changing the operation of the base station too frequently, there may be a timer set so that the operations of block 304 may not be automatically initiated immediately.

In the simple presentation of the optimisation cycle 300, although optimisation is described as being carried out only in relation to a single cell, there may be some balancing between neighbouring cells as will be described in the following.

In one embodiment of the invention, although the optimisation cycle 300 is described as being for a single cell, TXP is adjusted in a collaborative manner with respect to neighbouring cells. This may involve the use of relevant KPIs both from the cell being optimised and one or more neighbouring cells in the capacity- and coverage-related blocks of the optimisation cycle 300. Alternatively, it may involve the use of relevant KPIs from the cell being optimised and then there is a separate optimisation cycle 300 carried out in respect of one or more neighbouring cells. Either way, the result of using KPIs may be to change TXP of a cell being optimised in one direction (increased or decreased) and to change TXP of a neighbouring cell in the opposite direction. This may have the effect of transferring some of the load between the cell being optimised and the neighbouring cell. In an extreme case, this may lead to TXP of the cell being optimised being decreased while a neighbouring cell's performance is monitored and if there is a sufficiently small impact on the neighbouring cell, the cell being optimised may be switched off.

If the invention is applied to collaborative optimisation with respect to neighbouring cells, for both localised and distributed variants, if it is determined to switch off one cell, this may lead to a decision to activate beam-forming in a neighbouring cell and/or to maximise TXP of the neighbouring cell to compensate for any coverage problem caused.

Therefore, in one embodiment of the invention, although the optimisation cycle 300 is applied in relation to a single cell, decisions may be made based on performance monitoring of neighbouring cells. In the optimisation cycle 300, an optimal solution is selected. In a variant of the invention, cells having coverage and capacity problems are optimised first and then other cells which do not have such problems, or in fact have a sufficiently high coverage and capacity, are optimised.

Although optimisation is shown in FIG. 3 is described as showing an optimisation method, it does not have to be performed so that the optimisation adjustments to AAS operation in a cell are necessarily carried out. It may generate potential optimisation adjustments for one or more cells but the optimisation adjustments are not necessarily carried out. For example, optimisation of two cells may indicate that each can be de-activated or have its AAS operation adjusted. However, it may then be decided that optimisation adjustments are to be carried out only in respect of one cell. This may be decided at a higher level, for example in an NMS, or at a lower level, for example following negotiation between base stations. In one particular embodiment of the invention, the optimisation steps of FIG. 3 may be applied to a group of more than two base stations in order to determine suitable candidate optimisation actions which may potentially be applied to the base stations and then further decision-making steps are carried out to determine which optimisation actions are actually applied to which base stations. The group of base stations may be neighbouring, that is, each base station in the group may have as a neighbour at least one other base station in the group.

The optimisation cycle 300 is shown and described being applied to a cell having AAS capabilities. However, it may also be applied to cells which do not have AAS capabilities or to cells where some have AAS capabilities and some do not. As will be seen from FIG. 3, for cells having AAS capabilities, it is possible to adaptively change applied AAS techniques (such as MIMO and beam-forming) and TXP of the antenna. In the case of cells not having AAS capabilities or having a reduced set of AAS capabilities, it may only be possible to adaptively change whichever AAS capability may be present and/or to change TXP or switch off the cell.

As mentioned in the foregoing, in the invention, decision making may be based on KPIs. However, in other embodiments of the invention, other information may be used. For example, a decision-making entity in the OAM, or in a suitable part of the NMS, or the SON modules in base stations, gather(s) KPIs received from the base stations as described in the foregoing, as well as data about current configurations, notifications about failures and alarms, geo-location information and information about policies which have been applied by a network operator. If the decision-making takes place in the OAM, since configuration management is part of the OAM, information about configuration management is readily available. Geo-location information may be reported by base stations to the OAM. It may have been stored during a network planning phase, during a deployment phase, or updated by network elements added to the network in an automated way. Information about policies may be kept in a network management entity. These policies may be used to prioritise coverage or capacity optimisation or enable/disable some features, such as switching on or off of base stations. Geo-location may used for beam-forming or for predicting whether switching off a cell is likely to cause problems. Alarms may indicate problems so that inappropriate actions in the network are not applied. For example if there is cell outage a neighbouring cell should not be switched off even though performance indicators suggest that this might be an appropriate action.

In one embodiment of the invention, optimisation may be based on information other than KPIs. It may be based on measurements, counters and reports, for example corresponding reports from neighbour cells. It may be based on this information communicated between eNBs.

The three optimisation approaches: centralised optimisation, distributed optimisation, and localised optimisation, will now be discussed in more detail.

In centralised optimisation, the NMS 214/OAM is provided with KPI data from a large group of cells, which it then analyses. Once the analysis is complete, the NMS 214 proposes different cases, and then chooses an identified case which is most beneficial in terms of cost and performance. This is done according to the policies of a network operator, for example a particular policy may prioritise cost saving. In this approach, the optimisation cycle 300 is performed in the NMS 214, with a specific EM 212 making the decision in terms of balancing between neighbouring base stations. In this approach, for each optimisation cycle (which can be determined by an operator or to correspond to a minimum KPI reporting interval) every cell and its neighbours are evaluated and a balanced decision is made in terms of power consumption, capacity, and coverage according to an operator's policies/targets. As discussed in the foregoing, centralised optimisation can be carried out for cells which are not neighbouring to each other. It may be applied cell by cell. It may use the most appropriate combination of a proposed set of decisions provided by running the algorithm 300 a number of times.

In distributed optimisation, the SON module of a base station obtains KPIs from neighbouring base stations, and an optimisation cycle 300 in each SON module makes a decision. This involves negotiation between SON modules in base stations, and choosing an option which looks most favourable.

In localised optimisation, one base station is optimised at a time. Although this could be done considering the base station purely in isolation, this may cause problems with respect to one or more neighbouring base stations. To deal with this, it is preferred to notify neighbouring base stations that there has been a change, so that they can then carry out their own tests to see if their operation needs to be changed. In this case, the optimisation cycle 300 is performed in individual base stations.

An example outcome of applying the invention will now be described. In this case, a cell is experiencing low traffic load. It might be undesirable to switch off the cell even though there are interference limited neighbours in a situation in which there is also at least one noise limited neighbour. Accordingly, it may be determined that a MIMO branch of the cell's base station can be switched off and power decreased and beam-forming be used to maintain coverage or that the AAS capabilities may be completely switched off if the performance of the cell (and neighbouring cells) is likely to remain within acceptable parameters.

The KPIs may be collected periodically according to whatever collection period is pre-defined or what may be desired, For example, KPIs may be collected every five minutes, every hour, or every chosen period. If the method is centralised, the NMS 214 may collect KPIs according to a configured/specified time interval of, say, fifteen minutes. It is also possible to report KPIs whenever a sufficient number of statistics has been collected. In this case, collection may not be periodical.

Using the method according to the invention, reliable self-optimisation providing sufficient energy saving is applied via adaptive usage of advanced antenna technologies. Moreover, cells may be gradually switched-off in a way which is able to avoid creating coverage holes and energy-saving can be achieved for wide range of cellular radio network environments by turning off either RF chains that are used for MIMO or beam-forming techniques or decreasing TXP by having regard to cell relationships and their environment in the network.

Figure 4A:
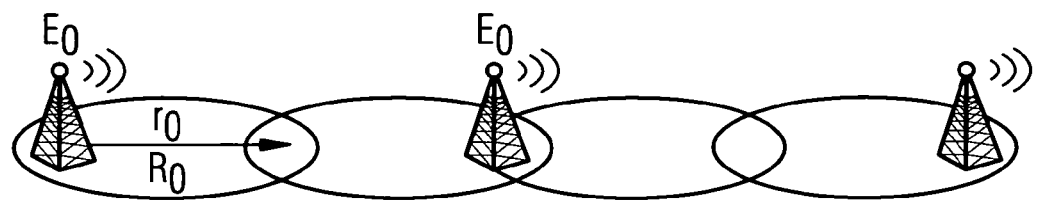
Figure 4B:
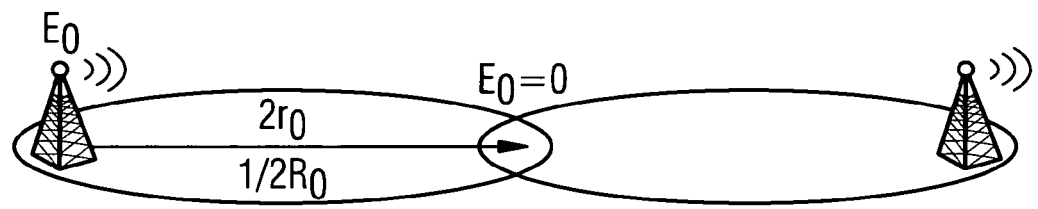

Referring to FIGS. 4(a) and 4(b) this shows two modes of a network depending on prevailing conditions, with the relevant mode being determined according to FIG. 3. FIG. 4(a) shows a non-energy-saving mode in which MIMO is on and beam-forming is off. MIMO can be reduced/switched off in a low traffic case. However, activating beam-forming is not relevant for a low traffic case and so beam-forming is not changed. FIG. 4(b) shows an energy saving mode in which some cells are switched off, MIMO mode is not used but instead beam-forming has been re-activated to maximise coverage. This is a mode which suits a relatively low maximum throughput per user. The network may switch from the mode of FIG. 4(a) to the mode of FIG. 4(b) if KPIs indicate high strength quality. In this case, it may be determined that a middle base station can be switched off and beam-forming can be used to provide coverage in order to avoid a coverage hole. However, in order for it to be justified for MIMO to be reduced/switched off, there also needs to be a low traffic case in which case there might be both reduced/switched off MIMO and active beam-forming. If there is a high traffic case, MIMO may still be kept (fully) active.

In these Figures, R represents peak data rate, r represents cell radius, and E represents energy consumption.

Therefore, it will be seen that assuming that there is a low level of traffic and more PRBs can be allocated for active users, switching off MIMO does not necessarily have to cause problems. This is because adaptive use of advanced antenna technologies, in this case beam-forming, can be employed in order to cover areas that would otherwise now be uncovered. This can be achieved without any additional power usage being required. If the level of traffic then increases, cells may be switched on, beam-forming gain becomes less significant, and power is consumed by MIMO instead of by beam-forming so that capacity may be increased and greater energy-saving may be provided.

Application of the different energy-saving modes in relation to an antenna system 500 is shown in FIG. 5. It will be appreciated that FIG. 5 is a highly schematic representation of an antenna system. The antenna system 500 comprises two antenna blocks 502 and 504. The antenna block 502 comprises four antenna columns 506, 508, 510, and 512, and the antenna block 504 comprises four antenna columns 514, 516, 518, and 520. Each antenna column comprises eight antenna elements 522. This is shown in FIG. 6 as an example in relation to a single example column. The antenna elements are passive elements 522 driven by respective RF chains, referred to as active elements (AEs). They are capable of transmitting in orthogonal polarisations represented in the Figure as lines intersecting at right angles.

According to the invention, it is possible for one of, or both, antenna blocks 502 and 504 to be active, that is driven by corresponding RF chains. If one antenna block is active and the other antenna block is inactive, meaning one antenna block is being fed by active RF chains and the other antenna block is not being fed by active RF chains, the antenna system is operating according to a lower order MIMO mode, that is 2×2 MIMO. This refers to there being one block in which there is both transmit and receive activity with each activity being able to occur in each of the two orthogonal polarisations. If both antenna blocks are active, the antenna system is operating according to a higher order MIMO mode, that is 4×4 MIMO. This refers to there being both transmit and receive activity with each activity being able to occur in each of the two orthogonal polarisations, with this occurring in both antenna blocks. Because the antenna system 500 is cross-polarised, 2×2 MIMO is the minimum MIMO order. Switching between these MIMO modes enables switching between a higher data transfer state and a lower data transfer state.

It should be understood that further levels of de-activation can occur. For example, individual RF chains, or groups of RF chains, can be de-activated so that, in terms of a single antenna block, individual antenna columns, or groups of antenna columns, can be rendered inactive. This is shown in FIG. 5 in which four modes, 1 to 4, representing a lowest to a highest energy saving, are presented. In a first mode, mode 1, all RF chains are active and both antenna blocks 502 and 504 are fully active. Therefore, both beam-forming and a higher order MIMO, 4×4, are in operation. In a second mode, mode 2, half of the RF chains, that is those connected to one antenna block 502, are active and this antenna block 502 is fully active. The antenna block 504 is inactive. Therefore, both beam-forming and a lower order MIMO, 2×2, are in operation. In a third mode, mode 3, a quarter of the RF chains connected to each of the antenna blocks are active in order to drive the antenna columns 506 and 514 and so both antenna blocks are active, albeit it in a reduced state. Therefore, beam-forming is not active because there is only a single antenna column 506, 514 active in each antenna block and so individual beams from neighbouring antenna columns do not combine to provided a focused beam. This is because, to provide horizontal beam control, that is beam-forming, it is necessary to use a number of antenna columns, for example 2, 3, or 4 antenna columns. If beam-forming is not operational, it is possible to reduce operation in an antenna block to use a single column. However, a higher order MIMO, 4×4, can still be in operation. In a fourth mode, mode 4, a quarter of the RF chains connected to only one of the antenna blocks 502 are active and so this antenna block is active, albeit it in a reduced state. The antenna block 504 is inactive. Therefore, beam-forming is not active because there is only a single antenna column 506 active in the antenna block 502. Furthermore, a lower order MIMO, 2×2, is in operation.

Table 1 shows estimated energy-saving percentages as a result of switching between the modes 1 to 4. The savings come from the fact that the number of RF chains which are active varies according to the operational mode of the antenna system 500.

TABLE 1

| | estimated OPEX Saving in AAS self-optimisation | | |
|---|---|---|---|
| Mode | RX × TX<br>MIMO (4 × 4 → 2<br>blocks, 2 × 2 → 1 block) | Horizontal beam control<br>(ON → 4 columns, OFF<br>→ 1 column) | Approximate<br>OPEX<br>Saving |
| 1 | 4 × 4 | ON | 0% |
| 2 | 2 × 2 | ON | 43% |
| 3 | 4 × 4 | OFF | 64% |
| 4 | 2 × 2 | OFF | 74% |

As will be appreciated from the foregoing, use of the invention may involve switching RF chains on and off. However, on/off switching may decrease the life-time of base station equipment and may adversely affect efficiency because of instability problems.

In a refinement, or an alternative, of the invention, an implementation is proposed to save CAPEX, prolong the life time of base station equipment, and prevent instability problems caused by switching RF chains on and off.

MIMO techniques are widely used in cellular radio networks to increase capacity as is mentioned in the foregoing and, advantageously, may be used when traffic load is high. However, it is generally not necessary to use MIMO if there is sufficient traffic capacity. Similarly, whether beam-forming is used may depend on network conditions. Beam-forming may provide benefits when the traffic load is low. This may particularly be the case if, in response to the low traffic load, TXP is decreased or nearby base stations are switched off to save energy. On the other hand, operational advantages provided by using beam-forming become less significant when the traffic load is very high and inter-site distance is smaller. It may actually increase interference.

Therefore, according to the invention, it is assumed that as a general rule, when traffic load is high, beam-forming may be reduced or switched off and MIMO may be switched on or increased, and when traffic load is low, beam-forming may be switched on or increased and MIMO may be reduced or switched off. With this in mind, it has been recognised that the implementation cost of advanced antenna systems can be significantly decreased with the help of adaptive usage of common RF chain(s)/AE(s). However, the number of antenna radiators and their layout may be kept to be effectively the same as conventional antenna design, for example in the schematic configuration shown in FIG. 5. Consequently, cost savings may be obtained by the reduction of required RF chains or active elements not from the change in antenna radiator layout.

A corresponding implementation of an antenna system comprises a plurality of antenna radiator elements, that is passive elements, a plurality of RF chains, that is active elements, and a switching arrangement which is capable of switching links between the active elements and the passive elements. The effect of the switching arrangement is shown in FIG. 7 in which it operates to provide combinations of linked passive and active elements linked so that, in one state, the antenna system is in a mode to provide a higher order MIMO and a lower order of beam-forming (Mode A), and, in another state, it is in a mode to provide a lower order MIMO and a higher order of beam-forming (Mode B). There may also be one or more additional states. For example, there may be a state in which there is a combination of linked passive and active elements so linked in order to provide a higher order MIMO and a lowest order of beam-forming (Mode C), and a state in which there is a combination of linked passive and active elements so linked in order to provide a lower order MIMO and a lowest order of beam-forming (Mode D).

Figure 8A:
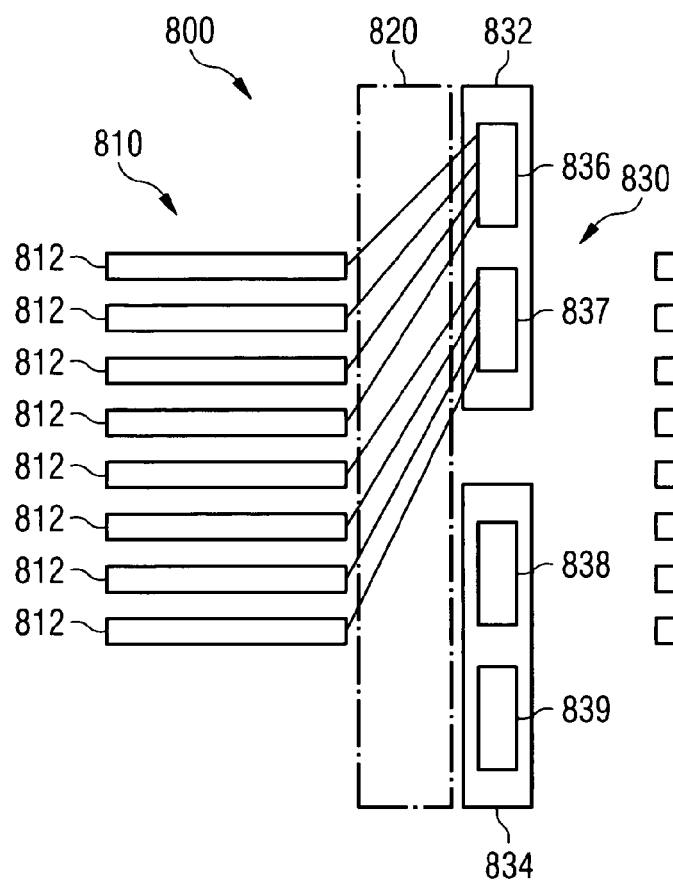
Figure 8B:
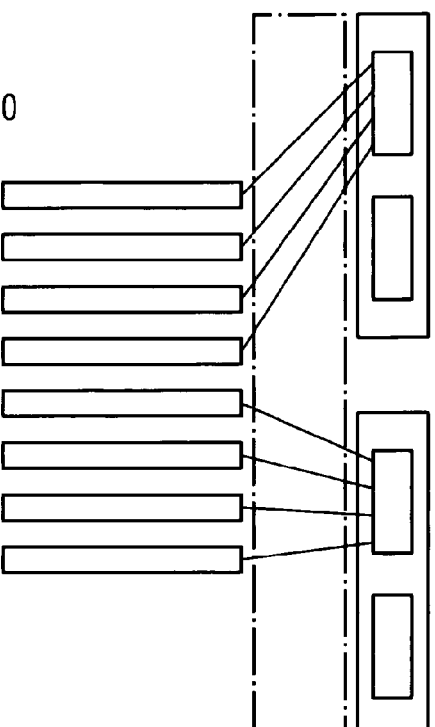

The active elements, the switching arrangement, and the passive elements referred to in the foregoing are shown in FIGS. 8(a) and 8(b). These Figures show an antenna system 800 comprising a plurality of active elements 810, a switching arrangement 820, and a plurality of passive elements 830. In common with FIGS. 5 and 7, the plurality of passive elements 830 comprises two antenna blocks 832 and 834. The antenna block 832 comprises two antenna columns 836 and 837, and the antenna block 834 comprises two antenna columns 838 and 839. Each antenna column comprises four antenna elements (not shown). The plurality of active elements 810 comprises eight RF chains 812 each of which drives a corresponding antenna element, although the particular antenna element which is corresponding may vary as is described in the following.

The effect of the switching arrangement 820 can be seen in the difference between FIG. 8(a) and Figure (b). In FIG. 8(a), the switching arrangement 820 links together the RF chains 812 and the antenna columns 836 and 837 of the antenna block 832. The antenna columns 838 and 839 of the antenna block 834 are not connected to RF chains and are thus idle. FIG. 8(a) corresponds to Mode B of FIG. 7 in which there is a lower order MIMO and a higher order of beam-forming. In FIG. 8(b), the switching arrangement 820 links together the RF chains 812 and the antenna column 836 of the antenna block 832 and the antenna column 838 of the antenna block 834. The antenna columns 837 and 839 of the antenna blocks 832 and 834 are not connected to the RF chains and are thus idle. FIG. 8(b) corresponds to Mode C of FIG. 7 in which there is a higher order MIMO and no beam-forming.

In other words, if a capacity-related problem is detected, MIMO may be used and a common RF chain may be activated for MIMO and automatically de-activated for beam-forming and if a coverage-related problem is detected, a common RF chain may be activated for beam-forming and automatically de-activated for MIMO. As a result, the number of RF chains needed for satisfactory operation may be decreased (providing a saving in CAPEX) and also the reduction of switching on and off may provide an additional benefit of prolonging the life-time of base station equipment. Furthermore, the size and weight of base stations may be reduced, and stability problems due to repeated switching on and off of antenna elements of the base station may be ameliorated.

FIG. 8 is presented as a simpler arrangement having fewer elements than the systems of FIGS. 5 and 7 simply for the purposes of easier presentation. It will be understood that the system of FIG. 8 may be constructed in a variant corresponding to FIGS. 5 and 7 having four antenna columns per antenna block and eight antenna elements per antenna column, with an RF chain being provided for the antenna elements. Because of the simpler presentation of FIG. 8, it will be appreciated that only two switched modes are shown.

In the variant of FIGS. 5 and 7, the antenna system has 2 antenna blocks×4 antenna columns×8 antenna elements=64 antenna elements. In a conventional arrangement, there would thus be 64 RF chains for each antenna system. According to the invention, it is recognised that if beam-forming is operational and the higher order 4×4 MIMO is not, then one of the antenna blocks and its 32 RF chains connected to that antenna block are not needed. It is also recognised that if the higher order 4×4 MIMO is operational and beam-forming is not, although both antenna blocks need to be used, only one column per antenna block is required, although of course a greater number could be used. As a result, use of RF chains connected to three of those antenna columns is not required.

In particular, different configurations of radiator elements are required depending on whether the mode is higher order MIMO or beam-forming. In beam-forming, closer radiator elements are used because correlation between adjacent radiator elements is needed in order for beam-forming to occur. In higher order MIMO, it may be desirable to use radiator elements which are further apart.

Accordingly, 32 common RF chains may be switched between modes so that almost half of the implementation cost is saved. This is represented in Table 2 which shows approximate CAPEX saving and supported AAS modes for a cross-polarised antenna (having a 2×2 MIMO is minimum MIMO order) in the form of an AAS switching implementation.

TABLE 2 approximate CAPEX savings and supported AAS modes

| Number of RF chains in original case | Number of RF chains in AAS switching case | Supported modes | | CAPEX saving with respect to "both modes on" implementation |
|---|---|---|---|---|
| | | MIMO (max. 4 × 4) | Horizontal beam-forming | |
| 64 | 32 | 4 × 4ON | OFF | 45% |
| | | 2 × 2OFF | ON | |
| | | 2 × 2ON | OFF | |

If it is determined that the network is able to run satisfactorily without a higher order MIMO and beam-forming, both may be de-activated. De-activation of MIMO does not necessarily mean that MIMO is completely switched-off. Instead, the lowest MIMO order is used, for example 2×2.

Therefore, it will be seen that there are RF chains in common connected to different groups of antenna columns. This may provide an antenna system in which, compared to the prior art, the number of antenna radiators can be reduced while there is still a sufficient number available to support both beam-forming and MIMO techniques.

It will be understood that according to the invention, each of the switched modes of FIG. 7 may be provided. Switching between the modes of FIG. 7 can be triggered by an optimisation method similar to that described in relation to FIG. 3 in order to have a self-optimising AAS switching implementation. Therefore, the optimisation cycle may be configured to provide four outcomes which differ from the four outcomes occurring as a result of the operation of the optimisation method of FIG. 3. In this case, the outcomes may be:

1) If there is sufficient capacity, the outcome will be a reduction in the operation of the MIMO capability of the base station, and also de-activation of beam-forming and minimisation of TXP in the case that there is sufficient coverage performance (Mode D).

2) If there is sufficient capacity, the outcome will be a reduction in the operation of the MIMO capability of the base station, and also activation of beam-forming and maximisation of TXP in the case that there is insufficient coverage performance (Mode B).

3) If there is insufficient capacity, the outcome will be an increase in the operation of the MIMO capability of the base station, and also de-activation of beam-forming and minimisation of TXP in the case that there is sufficient coverage performance (Mode C).

4) If there is insufficient capacity, the outcome will be an increase in the operation of the MIMO capability of the base station, and also activation of beam-forming and maximisation of TXP in the case that there is sufficient coverage performance (Mode A).

Accordingly, it will be seen that if the approaches of FIG. 3 and FIGS. 7 and 8 are combined, the result is that (1) the necessary energy required may be reduced by applying an optimisation method and (2) the necessary equipment required may be reduced by switching between AAS modes.

A drawback of the antenna system of FIGS. 8(*a*) and 8(*b*) is that beam-forming and highest MIMO order cannot both be used at the same time. However, since the need for both to be simultaneously employed usually indicates that there is both a coverage and a capacity problem, a network operator will tend to deploy another base station in such a problematic area.

In this implementation, the antenna system is coupled to a SON module. The SON module receives KPIs (which may be KPIs themselves or processed results based KPIs) from a base station or a number of base stations. The SON module is able to assess this input and carry out an optimisation operation resulting in the base station of the SON module operating in the most suitable mode. The optimisation operation may provide a determination whether there is a network condition which is classified as a capacity related problem (such as insufficient capacity) or a network condition which is classified as a coverage related problem (such as a coverage hole). In effect, the determination is an assessment of which would benefit the network more in a choice between more capacity provided by a operating the antenna module in higher order MIMO and not having beam-forming or operating the antenna module in lower order MIMO and having beam-forming in the locality of the base station.

The optimisation operation may be the SON module self-optimising its associated base station based on the KPIs or optimising in cooperation with other base stations (in particular SON modules of other base stations). In another embodiment, the optimisation/determination is/are carried out in a higher layer such as a management entity which is able to provide the processed results as an optimisation instruction to relevant SON modules which are then able to take appropriate action.

According to the optimisation/determination of the SON module, or the processed results it receives, the SON module takes action to operate the antenna module in a mode to provide a higher order MIMO or to provide beam-forming.

The invention provides advantages over the measure of simply switching-off a cell to achieve energy saving. Application of the invention is able to provide energy-saving in high and low traffic conditions via MIMO mode/beam-forming activation/de-activation in a way which does not create a problem in terms of coverage or capacity because mobility related measurements and reports, signal quality measurements, and KPIs provide feedback to indicate whether a proposed change is likely to create coverage holes. Load related KPIs (number of users, number of utilised resources, services and other quality-of-service (QoS) data) and admission control decisions (reported as KPI) provide the feedback for capacity optimisation. The invention also provides an antenna (and control) implementation capable of supporting both higher order MIMO operation and beam-forming having a dual-use antenna arrangement to provide reduced CAPEX. It will be recognised that the concepts of optimising MIMO mode and beam-forming and a dual-use antenna arrangement can be considered to be independent concepts and either or both may be applied.

The invention enables cells to be switched off reliably following problem identification. In addition, adaptive usage of advanced antenna technologies provides enhanced energy-saving by turning off power amplifiers (PAs) because according to the invention, power optimisation may be applied by taking into account low traffic load and also high traffic load. Since the duration of high traffic load periods is generally arranged to be longer than the duration of low traffic load periods (because network planning is arranged so cells are expected to operate at high load for much of the time), energy-saving may be further enhanced.

The invention relies on use of AAS system in at least some of the base stations in the network. The invention is to save energy and maximise capacity and coverage by switching between AAS/MIMO modes and adjusting TXP taking into account cell relationships based on reported measurements and KPIs in the network.

Problems may be identified more accurately by increasing the number of used measurements, and samples in KPIs, or by replacing them with more accurate ones.

The foregoing shows the method in an example to depict 3GPP LTE self-optimisation. The proposed method can be applied to other types of communications systems, for example cellular radio networks with corresponding quality, traffic, and failure and handover statistics collected in base stations and provided to a network management functionality for optimisation purposes. For example, the invention may be applied to 3 G communications systems. In this case, the decision-making needs to correspond to the architecture of the system, for example in 3 G communications systems, certain decisions may be made at a higher entity/controlling functionality level. In the particular case of a 3G system, counters and measurements including, for example, KPIs, for a number of cells are available in radio network controllers (RNCs) and so a SON module in an RNC may be configured to instruct adaptation of base stations and their antenna systems. In an alternative embodiment, information provided by a number of RNCs may be evaluated at a higher network management entity layer and decisions may be made by a higher network management entity which are then provided to the RNCs for them to act upon.

The invention enables antenna systems to save energy in conditions of continuous high traffic load by de-activating beam-forming to get energy-savings while keeping MIMO techniques active. It is also possible to decrease power if this does not adversely affect service. The invention operates by adaptive usage of MIMO techniques and beam-forming and TXP adjustment having regard to cell relationships and carrying out decisions having regard to measurement reports and key performance indicators (KPIs) to make sure that any changes applied to the system do not cause undesirable effects.

The invention enables minimisation of energy consumption when, for example, traffic load is low, while still providing sufficient service quality. It is also able to maximise capacity when, for example, traffic load is high without requiring extra power consumption. This may enable a lower operating expenditure because of lower electricity consumption and may thus provide environmental benefits due to lower $CO_2$ emissions. Furthermore, the invention achieves gains in terms of energy consumption, while avoiding problems such as induced coverage holes or insufficient capacity.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method comprising:
   receiving by a module in a wireless communication, system performance indicators, wherein the performance indicator relate to capacity and coverage;
   in response to receiving the performance indicators, controlling an antenna system by adjusting the following:
      order of MIMO provided by the antenna system, and
      at least one of beam forming and transmission power; and
   wherein in response to a cell being optimized not having sufficient capacity, the order of MIMO may be activated or increased.

2. The method of claim 1, wherein the performance indicators relating to capacity and coverage comprise at least two measurements selected from the following:
   quality, traffic/load, and mobility.

3. The method of claim 1, wherein the method is carried out in a SON module.

4. The method of claim 1, wherein in response to a cell being optimized not having sufficient coverage, at least one of the following shall be performed in order to provide coverage to any area identified as lacking coverage:
   activating beam-forming, and
   increasing transmission power.

5. The method of claim 1, wherein transmission power is adjusted in a collaborative manner between neighboring cells.

6. The method of claim 1, wherein in response one base station being switched off,
   activating beam-forming in a neighboring cell,
   maximizing the transmission power of the neighboring cell.

7. The method of claim 1, further comprising:
   generating a plurality of different cases of optimizing a number of cells, and
   choosing a case from the plurality of different cases which is most beneficial in terms of cost and/or performance.

8. The method of claim 7, wherein the choice of an optimization case is made at a hierarchical level higher than a network element level.

9. The method of claim 7, wherein the choice of an optimization case is made following negotiation between base stations.

10. The method of claim 7, wherein the choice is made according to the policies of a network operator.

11. The method of claim 1, wherein the method is carried out in relation to a base station which is capable of controlling an antenna system in which at least one active element is switched between a first antenna element and a second antenna element of an antenna system so that in one switched configuration the first antenna element is contributing to the antenna system operating in MIMO mode and in another switched configuration the second antenna element is contributing to the antenna system operating in beam-forming mode.

12. An apparatus comprising:
   a receiver for receiving performance indicators relating to capacity and coverage,
   a processing unit for using the performance indicators generate an instruction to adjust an order of MIMO provided by an antenna system and at least one of the level of beam forming and transmission power, wherein in response to a cell being optimized not having sufficient capacity, the order of MIMO may be activated or increased; and a transmitter for providing the instruction to enable it to be applied.

13. A communication system comprising:
a base station and an entity capable of controlling an antenna system, wherein the entity comprises:
a receiver for receiving performance indicators relating to capacity and coverage,
a processing unit for using the performance indicators generate an instruction to adjust an order of MIMO provided by the antenna system and at least one of beam forming and transmission power, wherein in response to a cell being optimized not having sufficient capacity, the order of MIMO may be activated or increased, and
a transmitter for providing the instruction to enable it to be applied.

14. A computer program product comprising software code embodied on a non-transitory computer-readable medium that when executed on a computing system performs a method of controlling an antenna system in which performance indicators relating to capacity and coverage are used to adjust the order of MIMO provided by the antenna system and at least one of beam forming and transmission power, wherein in response to a cell being optimized not having sufficient capacity, the order of MIMO may be activated or increased.

* * * * *